United States Patent [19]
Krooss

[11] Patent Number: 5,176,299
[45] Date of Patent: Jan. 5, 1993

[54] VARIABLE VOLUME HOPPER

[76] Inventor: Robert J. Krooss, 105 Lake Dr., Mountain Lakes, N.J. 07046

[21] Appl. No.: 704,383

[22] Filed: May 23, 1991

[51] Int. Cl.⁵ .............................................. G01F 11/00
[52] U.S. Cl. .................................. 222/405; 414/745.9; 414/746.2; 222/386.5
[58] Field of Search ............... 222/105, 183, 185, 160, 222/386.5, 392, 405, 406; 414/304, 509, 527, 745.9, 746.2, 796.7

[56] References Cited

U.S. PATENT DOCUMENTS

| | | | |
|---|---|---|---|
| 472,020 | 4/1892 | Acker | 222/405 X |
| 510,937 | 12/1893 | Schrag | 414/304 |
| 1,279,089 | 9/1918 | Dolbear | 414/304 |
| 2,537,381 | 1/1951 | Turner et al. | 414/527 |
| 2,551,368 | 5/1951 | Flinchbaugh | 414/527 |
| 2,563,158 | 8/1951 | Claffey | 414/527 |
| 2,569,191 | 9/1951 | Peterson et al. | 414/527 |
| 2,595,395 | 5/1952 | Lavelle et al. | 414/527 |
| 2,767,536 | 10/1956 | Forkel | 222/405 X |
| 3,045,846 | 7/1962 | Clark | 414/745.1 X |
| 3,506,142 | 4/1970 | White | 414/745.9 X |
| 3,774,779 | 11/1973 | White | 414/746.2 |
| 4,147,260 | 4/1979 | Kaji et al. | 414/745.9 X |
| 4,470,749 | 9/1984 | Koudstaal | 222/392 X |
| 5,017,074 | 5/1991 | Fabbri | 414/746.1 X |

FOREIGN PATENT DOCUMENTS 1964396 7/1971 Fed. Rep. of Germany ...... 222/405

Primary Examiner—Kevin P. Shaver
Attorney, Agent, or Firm—Stephen E. Feldman

[57] ABSTRACT

A hopper with two sets of parallel sides and a bottom, connected at ninety degree angles forms a rectangular shell. An opening in one of the sides, remote from the bottom, forms a dispensing port. An internal liner is connected, at one of its ends to the side in which the opening is located, at a location just below the opening. The liner extends down the one side, across the bottom and up the side opposite the one side. The liner supports bulk material stored in the hopper. A liner take-up mechanism is positioned over the side opposite the side in which the dispensing port is mounted. The liner is secured to the liner take-up mechanism. The liner take-up mechanism is operated to reduce the length of the liner positioned in the rectangular shell, thereby lifting the bulk material supported by the liner.

6 Claims, 3 Drawing Sheets

VARIABLE VOLUME HOPPER

BACKGROUND OF THE INVENTION

1. Field of the Invention

The present invention relates to hoppers for storing and dispensing bulk material. More particularly the present invention relates to a space saving hopper in which the storage capacity of the hopper is essentially equal to the volume of space taken by the structure of the hopper. From another aspect, the invention relates to a hopper in which the storage capability of the hopper is variable.

2. Prior Art

Webster's New Collegiate Dictionary, copyrighted 1975, defines a "hopper" as a funnel shaped receptacle for delivering material. In practice, a hopper is more often, a modified funnel shape receptacle which is used for storing and dispensing bulk material.

Present day hoppers are used for storing and dispensing a great variety of materials and products. The products stored are usually in bulk and/or in a jumbled state. The range of products that are found to be stored in hoppers is extremely great, ranging from animal food to human food, to stone, gravel and/or sand, to containers and many other products.

The modified funnel structure of a hopper is most often very large with a wide top and sloping sides, the sides converging to a relatively narrow or confined dispensing port. The purpose of the sloped sides is to permit gravity to move the product or material stored in the hopper, to a common place in the hopper, from where the material stored may be conveniently dispensed. In some hoppers the material stored in the chamber of the hopper is dispensed out a dispensing port located in the bottom of the hopper. In other hoppers, the material is dispensed out a dispensing port located somewhat above the bottom of the chamber of the hopper. In this case, a conveyor is often used to move some of the material stored in the chamber to the dispensing port.

A major disadvantage of the modified funnel-like structure hopper is the waste of space beneath the sloped sides of the hopper. This waste of space is an economic disadvantage in production operations where space is at a premium and is expensive.

This great loss of space is amplified when the hopper is located high above the working floor because of the bottom delivery of the modified funnel structure. In an attempt to reduce this great loss of space, the delivery or dispensing port of the hopper was elevated to a location above the bottom of the chamber and a conveyor assembly was positioned and used inside the chamber to transport the product stored in the chamber to the elevated dispensing port. The funnel shape of the hopper was essentially retained in order to bring the product stored in the hopper to a particular point or area in the bottom of the chamber so that cleated belts of an internal conveyor could capture and move, even the last of the product in the chamber to the dispensing port.

The disadvantage here is that the part of the conveyor belt that is subject to the greatest wear and has the greatest potential for breakage is inside the chamber of the hopper and any breakdown of the conveyor used to move the product stored in the hopper to the elevated dispensing port results in down time for the hopper.

SUMMARY OF THE INVENTION

The present invention provides a hopper that overcomes the disadvantages of the prior art hoppers in that the funnel shape of the chamber of the hopper has been done away with so that the chamber of the hopper of the present invention has a storage volume capability substantially equal to or very close to the volume of the space taken by the hopper structure. The structure of the hopper of the present invention is preferably a rectangular or cube-like shape box, the converging, sloping sides of the prior art hoppers being replaced with vertical walls. The small area bottom of the chamber of prior art hoppers has been replaced with a wide, large area bottom. In the new invention this rectangular structure forms a shell for the chamber of the hopper.

The dispensing port, for dispensing or unloading material stored in the chamber of the hopper is located in one of the vertical walls of the chamber, substantially elevated above the bottom of the chamber, near the top of the wall. An internal cover or liner is provided with one end of the liner secured to the vertical wall in which one dispensing port is located. The liner is secured to the wall at an elevation which is just below the lower or bottom edge of the opening of the dispensing port. The liner is draped down the interior of the vertical wall to the floor or bottom of the chamber, across the floor of the shell and up the opposite vertical wall to the top thereof, where a take-up roller is secured. The opposite end of the liner is secured to the take-up roller. The take-up roller includes a drive means which rotates the take-up roller either clockwise or counterclockwise so that, for example, by driving or rotating the take-up roller in a clockwise direction, when the liner is at extended length, the take-up roller effectively reduces the length of the liner covering the walls and bottom of the chamber, effectively raising the working floor or the bottom of the chamber, lifting the material or product held by the lines, the liner effectively forms the working part of the chamber. Any bulk material or product held in the chamber of the hopper, on the liner, will be lifted up, above the floor or bottom of the shell of the hopper.

Preferably the take-up roller is located on or over the wall opposite the wall in which the dispensing port is located with the take-up roller positioned above the level of the dispensing port. By securing the one end of the liner to the wall in which the dispensing port is located and at a level adjacent the lower rim of the dispensing port, when the length of the liner between the end secured to the wall and that portion of the liner secured by the take-up roller is shortened or reduced to a minimum length, the liner will form a flat, sloping surface between the take-up roller and the dispensing port. Any bulk material or product on the liner the material or product will slide down the liner and out the dispensing port.

When the length of the liner between the take-up roller and the front wall is in shortened length, the liner may be lengthened by, for example, driving the take-up roller counterclockwise so that the liner will be driven into the interior of the chamber of the hopper. The liner in the chamber may be increased in length so as to cover the front wall from the lower edge of the dispensing port, to and across the bottom of the chamber and the interior surface of the back wall. The purpose of the liner is to support or hold material stored in the chamber of the hopper and to lift or elevate the material to a position in the chamber where the material may be dispensed out of the dispensing port in the wall of the hopper.

The liner may be any flexible sheet of material capable of being rolled up on a take-up roller, and should have strength sufficient to hold the material stored in the hopper, and to lift the material. The sheet material may be cloth, canvas, rubber, plastic, leather, metal or any combination of materials. The liner may be a sheet or mesh or net or netting or any other sheeting. The liner may be reinforced with chain, cording, wire or strips of wood, leather, plastic, cloth or metal or any other materials. A conveyor belt may also be used as a liner but it is unnecessary to use an endless belt.

Preferably the liner and any reinforcing material used is flexible or at least, if not flexible, small enough to be rolled up around the take-up roller. The take-up roller for lengthening and shortening the liner in the chamber of the hopper may take any of several forms. For example, a windlass may be used, the windlass including a roller or cylinder and apparatus for rotating the roller or cylinder both clockwise and counterclockwise. The liner may be secured at one end, to the wall and, at the end opposite the wall to the roller or cylinder. When the roller or cylinder is rotated, for example in a counterclockwise direction, the liner is progressively wound around the roller or cylinder, effectively reducing the length of the liner in the chamber of the hopper. When the roller or cylinder is rotated for example clockwise, the liner is progressively unwound from around the roller or cylinder, effectively lengthening the length of the liner in the chamber of the hopper.

The lengthening and shortening of the length of the liner in the chamber of the hopper, between maximum and minimum lengths, effectively lowers and raises the liner in the chamber. By raising the liner in the chamber the effective capacity of the hopper is reduced. By lowering the liner in the chamber the effective capacity of the hopper is increased.

In order to make the novel hopper fully automatic, detectors, positioned at or near the dispensing port may be used to determine if and when the liner should be raised, lowered or held in position in the shell of the hopper.

Two detectors, one mounted high and one mounted low, with respect to the dispensing port, may be used. These may be detectors or sensors that sense the presence and absence of a body in a detection zone, or a change of color in the zone. Preferably, detectors that look at the material in the chamber of the hopper are used. When both detectors do not see any of the material in the hopper, "no-see" signals may be generated by both detectors. This combination of signals may be translated by a controller to raise the level of the material, relative to the dispensing port. When the level the material is raised so that both detectors see the material in the chamber, "see" signals may be generated by both detectors. This may be translated by a controller to stop raising the level of the material in the chamber, relative to the dispensing port.

A logic circuit may be used to translate the signals generated by the detectors so that the controller may control the drive means for the take-up roller so that when the hopper contains a material or product in the chamber, and the top of the material in the chamber is seen by both the high detector and the low detector, the drive means will be stopped. When the top of the material in the chamber is not seen by either the high detector or the low detector, the signals provided to the logic circuit may be translated into a drive condition so that the drive means is operated to raise the level of the material in the chamber. When the material in the chamber is seen by one detector and not seen by the other dectector, signals representing such detection may be indicative of an active change occurring in the chamber of the hopper. Such a control system may be used tp provide automatic dispensing of material stored in the hopper, when desired.

DETAILED DESCRIPTION OF THE DRAWINGS

Figure 1:
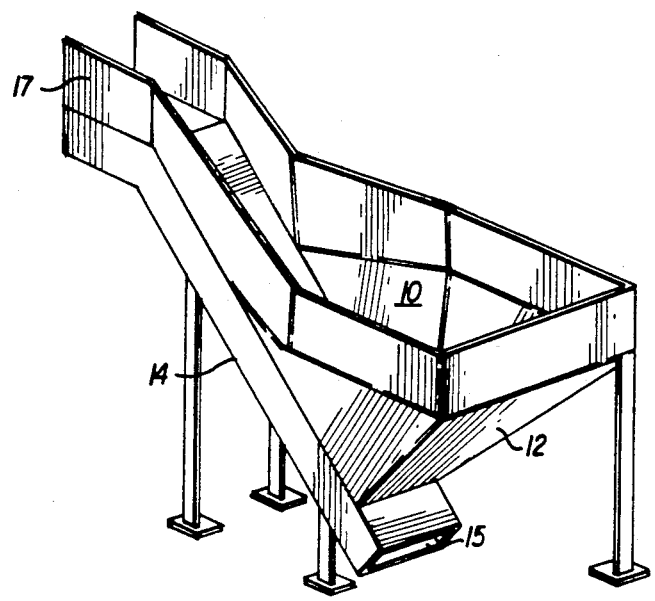
FIG. 1 is a pictorial representation of a prior art hopper.

FIG. 1 represents a modified funnel shaped hopper typical of the prior art. The main chamber 10 of the hopper has a wide upper section with sloping sides 12 and 14 which funnel to the dispensing port 15. The hopper includes a loading chute 17 that is used to load the chamber of the hopper. The hopper may be loaded with bulk material which may be stored in the chamber until all or part of the bulk material or product retained in the chamber is to be dispensed. When dispensing the stored material, the dispensing port is opened and the material is drawn, by gravity to the dispensing port. The waste of space under the converging walls of the hopper are obvious.

Figure 2:
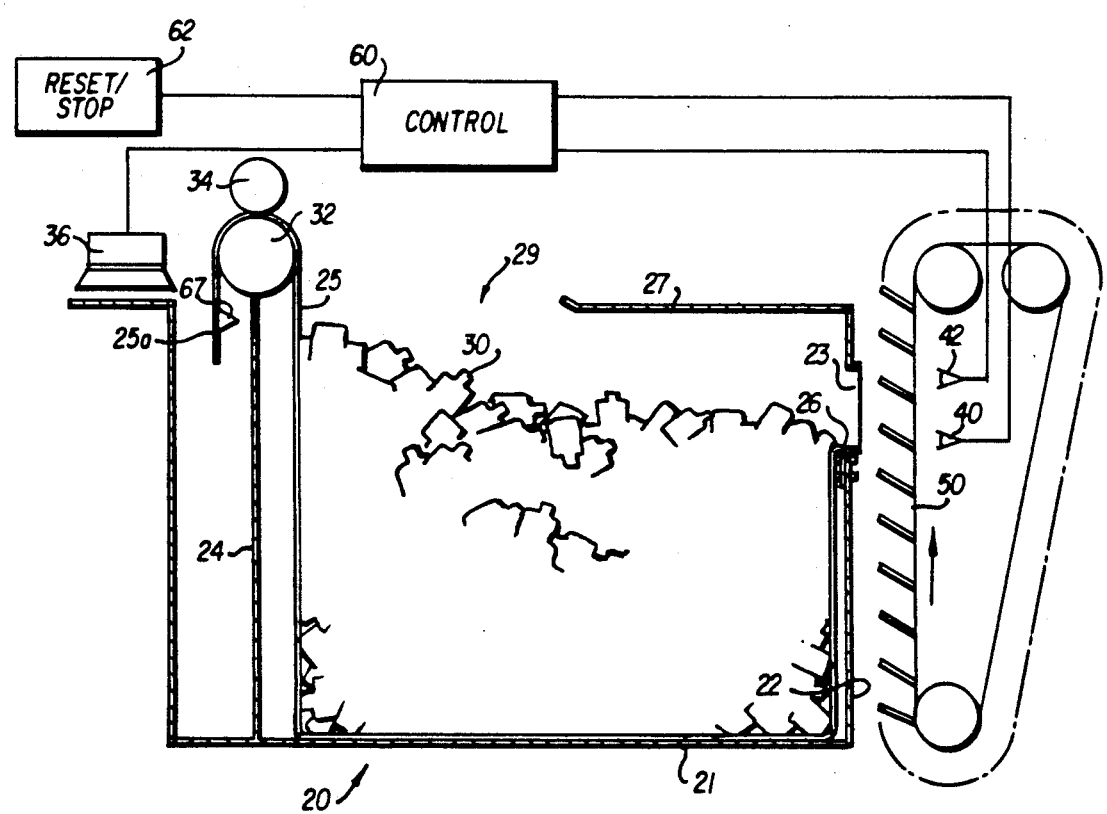
FIG. 2 is a representation of the present invention with the chamber of the hopper loaded with a product.
Figure 3:
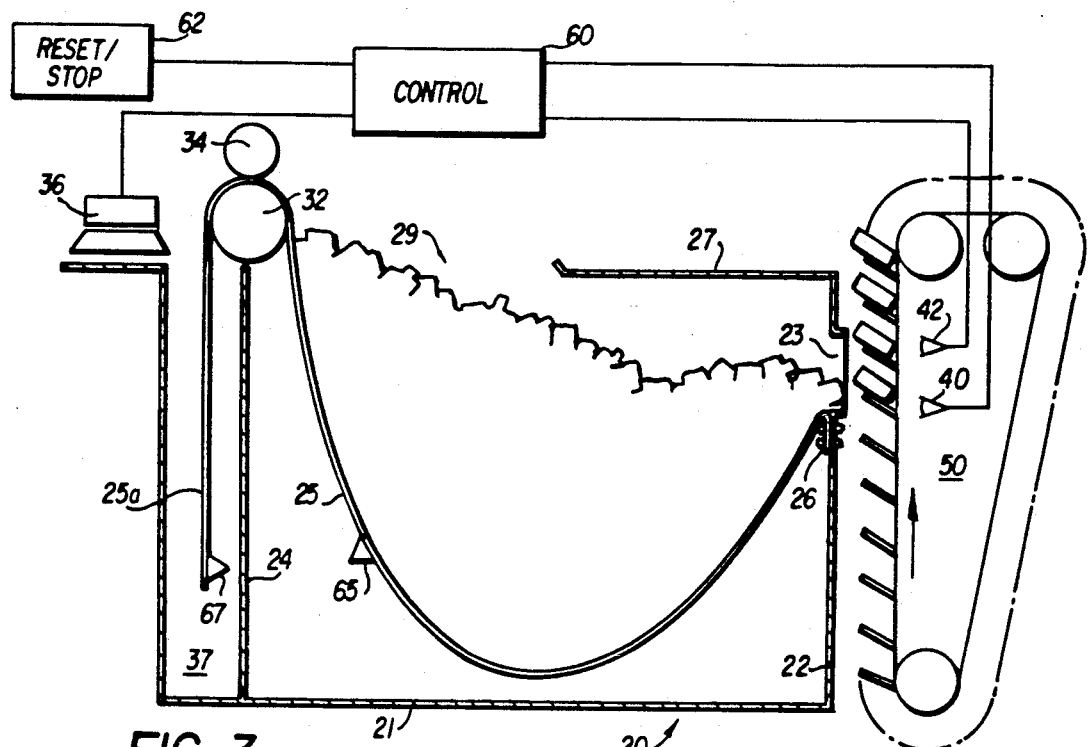
FIG. 3 is a representation of the invention represented in FIG. 2 partially unloaded.
Figure 4:
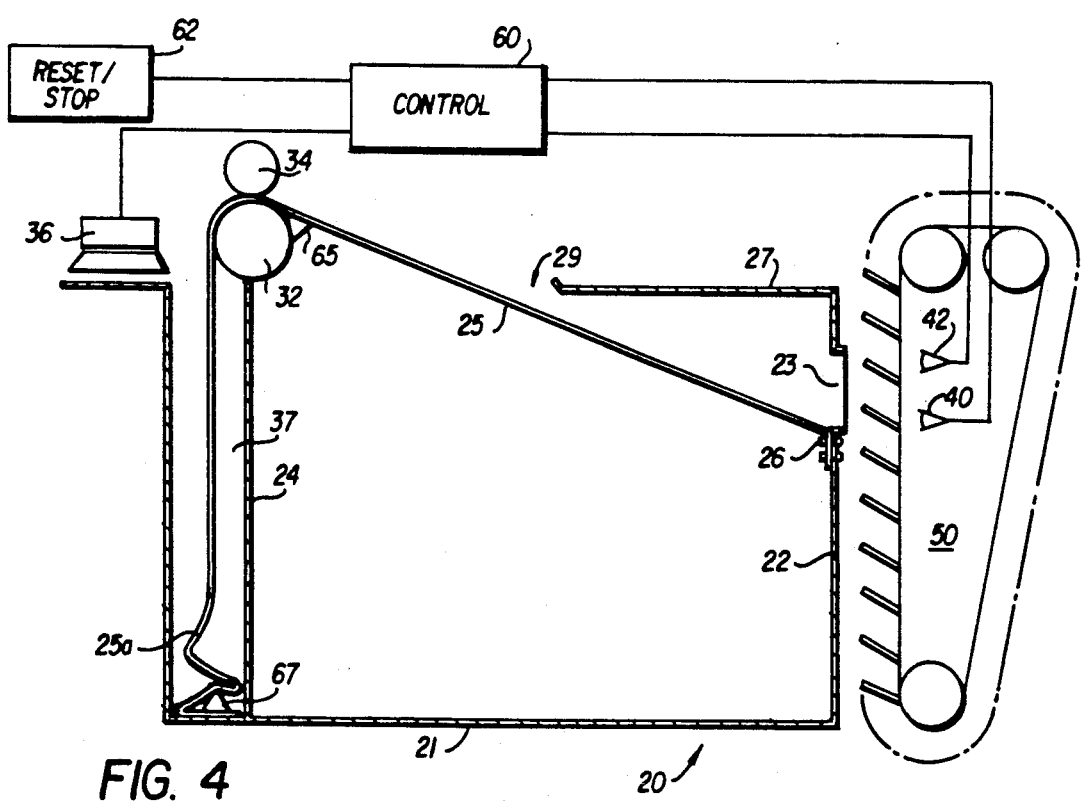
FIG. 4 is a representation of the invention represented in FIG. 2 fully unloaded; and, FIGS. 5a and 5b are representations of an alternate form of invention having two liners.

FIGS. 2, 3 and 4 represent a preferred embodiment of the present invention, in stages of operation, in which a rectangular shell is formed by four vertical sides or walls, a bottom and a top. The top includes an opening for loading the hopper. The walls, bottom and top are connected together forming a rectangular shell. The interior of the shell is the chamber of the hopper. The front wall 22 includes a dispensing port 23, the opening of which is located at or near the top of the wall. An internal cover or liner 25 is connected, at one of its ends, to the wall 22 at a level which approximates the level of the bottom of the opening of the dispensing port. The liner 25, when at its maximum length in the chamber, extends down the wall 22, across the bottom 21 and up the back wall 25 to a liner take-up mechanism located at or near the top of the wall 25. A bulk material represented as a jumbled mass of containers 30, such as plastic bottles, for example, is represented stored in the chamber of the hopper, on top of the open or upper surface of the liner. It should be understood that the term material or bulk material means and refers to any material or product that may be stored in a hopper and dispensed therefrom, without limitation.

The linear or internal cover is a flexible sheet of material or combination of materials that is capable of supporting the material stored in the hopper. The liner may be a sheet of mesh or netting or other sheeting made from leather, cloth, plastic, rubber, metal, glass or other material or any combination of materials. The liner may be reinforced for strength. The flexibility of the liner should be such as to permit the liner to be rolled up, around a take-up roller or cylinder, for example or be pulled by some take-up means and draped in the chamber of the hopper. A liner may include chaining attached to the liner for strength and/or to aid in lifting or changing the length of the liner in the chamber between the take-up device and the front wall.

A liner take-up device or liner take-up roller 32 is mounted over or adjacent the top of the rear wall 24 of the chamber of the hopper. The liner 25 may be secured to the roller or held by the roller, so that when the roller is rotated the liner is rolled up around the take-up roller. The take-up roller may take any of several forms. The take-up roller may be a plurality of rollers with smooth surface or a plurality of toothed wheels or gears with cogs, or an elongated smooth surface roller or two rollers which grip the liner. Preferably the take-up roller is an driven roller or cylinder with an idler cylinder on top of the driven cylinder, the two cylinders cooperating to hold the liner and reduce the length of the liner in the chamber when the driven roller is rotated in a counter cloakwise direction, for example, by a drive means, such as a bidirectional motor 36.

FIG. 3 represents that the take-up roller 32 has taken up part of the liner 25 that was in the chamber and transferred that part 25a to a retaining chamber 37. In taking up a portion of the liner 25, the material or product held in the liner is lifted off the bottom of the shell and the top of the mass is raised above the level of the dispensing port 23 so that the product may be dispensed out the dispensing port to a vertical conveyor 50. The vertical conveyor represents a means of carrying away individual products of bulk material.

With the take-up rollers mounted above the level of the dispensing port, when the liner is taken up by the take-up rollers the product in the hopper may be lifted above the opening of the dispensing port and fall or tumble toward the opening, pulled by gravity, to the dispensing port.

As seen in FIG. 4, the liner may be taken up or shortened enough so that the liner forms a substantially flat but slated surface between the back wall and the bottom of the opening of the dispensing port.

The liner is sufficiently wide so as to take up the full width of the chamber. As represented in FIG. 2, for example, the liner would cover all the interior of the rear wall 24 and the bottom 21 and that part of the front wall 22 that is below the level of the bottom of the dispensing port 23.

As represented in FIG. 4, the end 25a of the liner is dropped in the retaining chamber. Alternatively the end 25a of the liner may be rolled around the take-up roller 32. The hopper 20 may also include a top or cover 27 with an opening 29 for loading the chamber of the hopper.

Figure 5A:
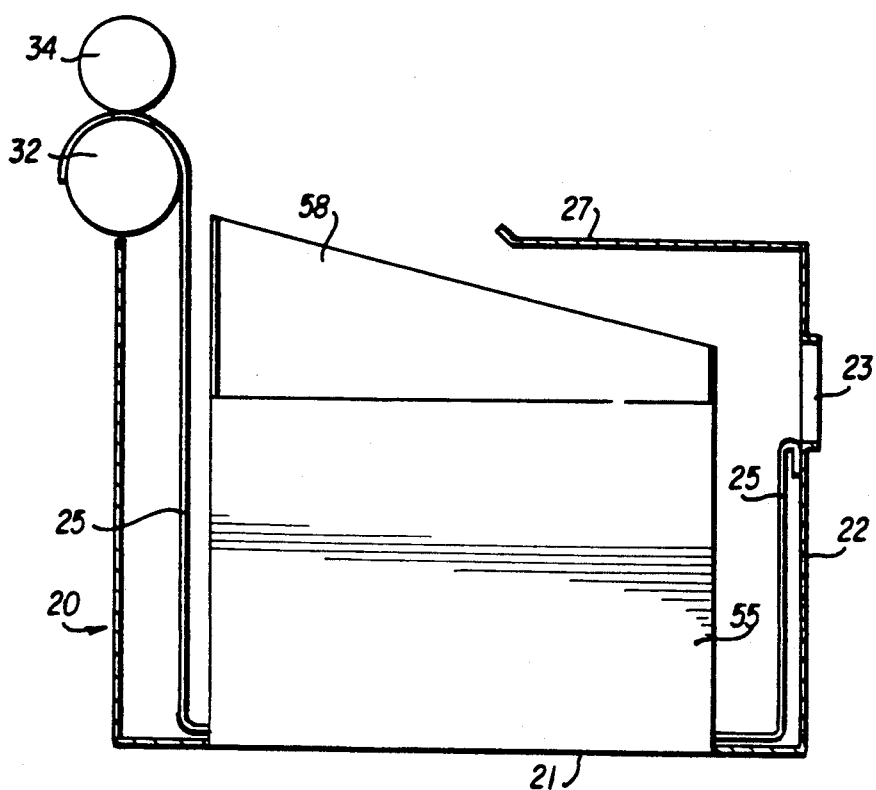
Figure 5B:
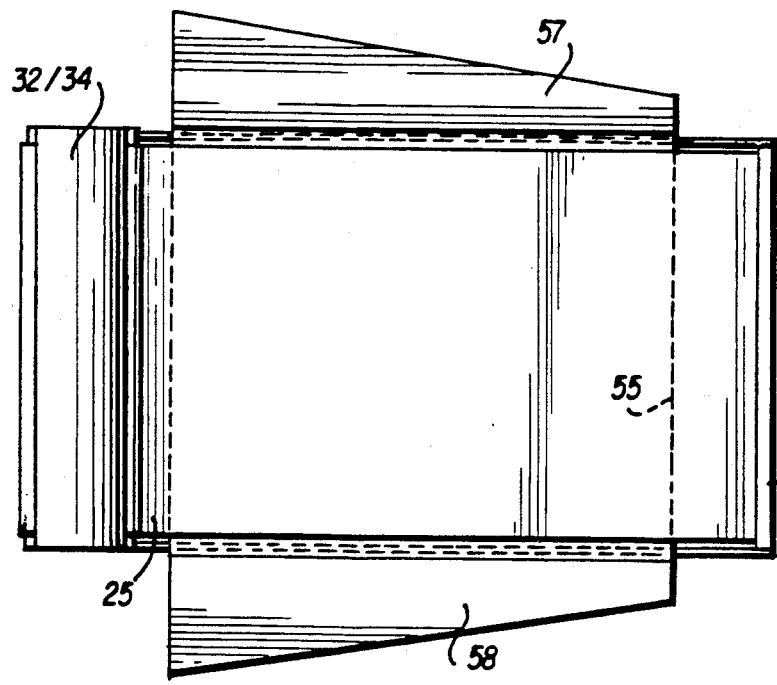

Although the preferred embodiment includes a single liner, a dual liner may be used, By dual liner is meant, one liner connected to the front wall, at the level of the bottom of the opening of the dispensing port and to the take-up roller positioned over the rear or back wall and, a second liner, connected, for example, to two rollers positioned over opposite side walls, such as represented in FIGS. 5a and 5b. The liner 25, in FIGS. 5a and 5b may be similar to the liner 25 represented in FIGS. 2, 3 and 4. However in FIGS. 5a and 5b a second liner 55 is connected to the rollers 57 and 58, the liner 55 extending down the side walls and across the bottom, transverse to the direction followed by the liner 25. The rollers 57 and 58 are mounted over the side walls and tapered so that as the liner 55 is raised, in conjunction with liner 25, the bottom of the liner 55 substantially follows the bottom of the liner 25.

Returning to FIGS. 2, 3 and 4, the lifting of the liner 25 may be made automatic, as by use of detectors 40 and 42 and a control system, which controls the on/off of the roller drive motor 36 and the direction of drive, for rotation the roller 32.

The control box 60 may include a logic circuit which receives signals from the detectors 40 and 42. The detectors 40 and 42 may each be any detector or sensor that detects the presence or absence of material or a change of color in a detection zone. Both detectors are positioned to "look" across the chamber of the hopper and "look-for" a presence or absence of material in the chamber at a particular level. Detector 40 is positioned low so as to look for material in the chamber at the level of the bottom of the opening of the dispensing port. Detector 42 is positioned high so as to look for material in the chamber at the level of the top of the opening of the dispensing port. Two different signals, one for "see" and another for "no-see", are provided from each detector.

It will be apprecticed that the hopper is loaded through the opening 29 is the top 27. As represented in FIGS. 2, 3 and 4, for example, the dispensing port 23 is mounted in the wall 22 substantially above the bottom 21 and somewhat below the top 27. When the chamber of the hopper is fully loaded with a mass of material, the top of the mass will be above the opening in the dispensing port. When the door (not shown) on the dispensing port is opened the flow of the individual elements of the mass of material will cause the top of the mass to become angled across the top, with the low part of the angle at the dispensing port and the high part of the angle adjacent the back wall 24.

When the chamber of the hopper is full, both the high detector 42 and the low detector 40 will "see" the material in the chamber. Both detectors will generate signals representing "see". The full extended condition of liner 25 generates a signal from stop 67 which is provided on the underside of the liner 25. The signals are applied to the logic circuit of control 60. The stop 67 signal will cause the control to prevent drive 36 from extending liner 25 any further. A combination of the stop 67 signal and high detector 42 "no-see" signal do not cause the control 60 to turn on drive 36. A combination of the stop 67 signal, high detector 42 "no-see" signal, and low detector 40 "no-see" signal cause the control to turn on drive 36 and retract or (or lift) liner 25. When the low detector 40 again has a "see" signal, the control 60 causes the drive 36 to stop.

As long as stop 67, the full hopper stop, and stop 65, the empty hopper stop which is mounted on the underside of liner 25, are not activated, the liner 25, is in the intermediate position. In this position, if low detector 40 and high detector 42 both have "no-see" signals, control 60 will cause drive 36 to retract or lift liner 25 until low detector 40 again has a "see" signal because the mass of material has been lifted enough to come to the level of low detector 40. This condition is the stable condition of the hopper during operation with liner 25 is the intermediate position.

Similarly, as long as stop 67 and stop 65 are not activated, if low detector 40 and high detector 42 both have "see" signals, as would be caused by a dumping of additional material in the hopper, control 60 will cause drive 36 to extend or lower liner 25 until high detector 42 again has a "no-see" signal because the mass of material has been lowered enough to drop below the level of high detector 42. This re-establishes the stable condition mentioned above. Please note that, because of their relative positions, it is not possible for low detector 40 to have a "no-see" signal and for high detector 42 to have a "see" signal.

The intermediate condition is the normal operating condition of the hopper. The full condition has already been described. The empty condition occurs when high detector 42 and low detector 40 signal "no-see" conditions and stop 65. The empty hopper stop, is activated. These three signals will cause the control 60 to stop the drive 36 from retracting or lifting liner 25 any further. When material is added to the hopper, a combination of the stop 65 signal, and low detector 40 "no-see" signal occur. This causes control 60 to turn on drive 36 and extend liner 25. This motion of liner 25 eliminates the stop 65 signal and the intermediate condition has been re-established.

It will be appreciated that a reset button or switch and a stop button are provided as a manual override, to signal the control, as desired.

The rectangular structure of the novel hopper provides a hopper in which virtually all the space occupied by the structure of the hopper is available for storage of a bulk material or a jumbled product. Loss of hopper storage space due to converging sides is avoided. The material or product stored in the chamber of the hopper is unloaded through an elevated dispensing port without the use of internal conveyors.

The purpose of the vertical conveyor 50 is to carry away the elements of the material as the material is unloaded from the hopper through the high positioned dispensing port. Other means of carrying the elements of the mass of material way may be used, if desired.

A preferred embodiment of the invention has been shown and described. A variety of material have been mentioned that may be used for the liner. Essentially the characteristics of the bulk material or the product stored in the chamber, on top of the liner, may be used to define the characteristics of the liner. Several different roller mechanisms have also been mentioned. An alternate construction of the invention, using two, cross-lapping liners has been shown and described. Other changes and modification which may become apparent to those skilled in the art, may be made without departing from the invention as defined in the claims.

What is claimed is:

1. A hopper for storing and dispensing a bulk material or products, said hopper comprising:
   a) a substantially rectangular chamber defined by at least a first side, a second side, a third side, a fourth side and a bottom side interconnected at substantially right angles, said first side and said third side being opposite and substantially parallel to each other, said second side and said fourth side being opposite and substantially parallel to each other;
   b) an opening in said first side defining a dispensing port, said opening being removed from said bottom side;
   c) a first liner having a first end and a second end and connected at said first end to said first side adjacent and below said opening, said first liner extending along said first side toward said bottom side and along said bottom side toward said third side and extending along said third side, away from said bottom side, said first liner for supporting said bulk material stored in said hopper;
   d) a first liner take-up means secured to said second end of said first liner for reducing the length of said first liner between said first side and said first liner take-up means for lifting said bulk material stored in said hopper;
   e) a second liner having a third end and a fourth end, said second liner extending along said second side toward said bottom side, along said bottom side toward said fourth side, along said fourth side toward the top thereof, said second liner being substantially transverse to said first liner; and,
   f) a second liner take-up means connected to said third end of said second liner for reducing the length of said second liner, said second liner for supporting said first liner during lifting of said bulk material.

2. A hopper as in claim 1 and in which said first liner is a flexible sheet material.

3. A hopper as in claim 1 and in which said first liner is reinforced for strengthening said first liner.

4. A hopper as in claim 1 and in which said second liner is a flexible sheet material.

5. A hopper as in claim 1 and in which said first liner take-up means includes a substantially parallel cylinder and a drive means and said drive means rotates said substantially parallel cylinder and said first liner is wound around said substantially parallel cylinder.

6. A hopper as in claim 5 and in which said second liner take-up means includes a tapered cylinder and a second drive means and said second drive means rotates said tapered cylinder and said second liner is wound around said tapered cylinder.

* * * * *